(12) United States Patent
Lee

(10) Patent No.: US 8,514,295 B2
(45) Date of Patent: Aug. 20, 2013

(54) AUGMENTED REALITY PROCESSING BASED ON EYE CAPTURE IN HANDHELD DEVICE

(75) Inventor: Te-Won Lee, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 313 days.

(21) Appl. No.: 12/971,121

(22) Filed: Dec. 17, 2010

(65) Prior Publication Data

US 2012/0154619 A1    Jun. 21, 2012

(51) Int. Cl.
  *H04N 5/228* (2006.01)
(52) U.S. Cl.
  USPC .................... 348/222.1; 348/239; 348/333.02
(58) Field of Classification Search
  USPC ............... 348/218.1, 222.1, 239, 333.02, 373
  See application file for complete search history.

(56) References Cited

U.S. PATENT DOCUMENTS

| | | | |
|---|---|---|---|
| 6,373,961 B1 | 4/2002 | Richardson et al. | |
| 6,437,758 B1 | 8/2002 | Nielsen et al. | |
| 6,522,360 B1 * | 2/2003 | Miyawaki et al. | 348/240.2 |
| 6,997,556 B2 | 2/2006 | Pfleger | |
| 7,556,377 B2 | 7/2009 | Beymer | |
| 2004/0100567 A1 * | 5/2004 | Miller et al. | 348/239 |
| 2008/0170748 A1 | 7/2008 | Albertson et al. | |
| 2009/0322671 A1 * | 12/2009 | Scott et al. | 382/103 |
| 2010/0260426 A1 | 10/2010 | Huang et al. | |

FOREIGN PATENT DOCUMENTS

| | | |
|---|---|---|
| WO | WO2005114476 | 12/2005 |
| WO | WO2008040576 A1 | 4/2008 |
| WO | WO2009131539 A1 | 10/2009 |

OTHER PUBLICATIONS

International Search Report and Written Opinion—PCT/US2011/065294—ISA/EPO—May 7, 2012.

* cited by examiner

*Primary Examiner* — Gevell Selby
(74) *Attorney, Agent, or Firm* — Brent A. Boyd

(57) ABSTRACT

This disclosure describes techniques that can improve and possibly accelerate the generation of augmented reality (AR) information with respect to objects that appear in images of a video sequence. To do so, the techniques of this disclosure capture and use information about the eyes of a user of a video device. The video device may include two different cameras. A first camera is oriented to capture a sequence of images (e.g., video) outward from a user. A second camera is oriented to capture images of the eyes of the user when the first camera captures images outward from the user. The eyes of the user, as captured by one or more images of the second camera, may be used to generate a probability map, and the probability map may be used to prioritize objects in the first image for AR processing.

47 Claims, 8 Drawing Sheets

COMBINED PROBABILITY MAP

| 1 | 0.02 | 0.01 | 0.01 | 0.01 | 0.01 |
|---|---|---|---|---|---|
| 0.02 | 0.02 | 0.01 | 0.01 | 0.01 | 0.05 |
| 0.01 | 0.01 | 0.1 | 0.01 | 0.01 | 0.05 |
| 0.01 | 0.01 | 0.01 | 0.01 | .025 | .025 |
| 0.01 | 0.01 | 0.01 | 0.01 | .025 | .025 |

FIG. 5

AUGMENTED REALITY PROCESSING BASED ON EYE CAPTURE IN HANDHELD DEVICE

TECHNICAL FIELD

The disclosure relates to augmented reality (AR) processing in which a device that captures video information can provide real-time information about one or more objects in the video information and, more particularly, to techniques that can improve and possibly accelerate the AR processing.

BACKGROUND

Augmented reality (AR) processing of video sequences may be performed in order to provide real-time information about one or more objects that appear in the video sequences. With AR processing, objects that appear in video sequences may be identified so that supplemental information (i.e., augmented information) can be displayed to a user about the objects in the video sequences. The supplemental information may comprise graphical or textual information overlayed on the frames of the video sequence so that objects are identified, defined, or otherwise described to a user. In this way, AR may provide an enhanced real-time experience to the user with respect to video sequences that are captured and displayed in real-time.

Unfortunately, AR processing can be very complicated, and may require extensive processing capabilities. Furthermore, in AR processing, it may be difficult to distinguish objects of interest to the user from objects that are irrelevant to the user within a video sequence. The supplemental AR information may be desirable for objects of interest, but may be less desirable, or even undesirable, for irrelevant objects. AR processing may be particularly challenging in hand-held devices, such as cellular telephones, smartphones, digital cameras, or other hand-held devices that support video capture, where processing capabilities and battery power are limited.

SUMMARY

This disclosure describes techniques that can improve and possibly accelerate the generation of augmented reality (AR) information with respect to objects that appear in images of a video sequence. To do so, the techniques of this disclosure may capture and use information about the eyes of a user of a video device. The video device may include two different cameras. A first camera is oriented to capture a sequence of images (e.g., a video sequence) outward from a user such that the first camera captures a scene that the user is viewing. A second camera is oriented to capture images of the eyes of the user when the first camera captures images outward from the user. The eyes of the user, as captured by one or more images of the second camera, may be used to generate a probability map, and the probability map may be used to prioritize objects in the first image for AR processing.

In one example, this disclosure describes a method comprising capturing a first image using a first camera of a handheld device, the first camera being pointed outward relative to a user of the handheld device, capturing a second image using a second camera of the handheld device, wherein the second image includes eyes of the user, generating a probability map based on the eyes of the user in the second image, generating augmented reality (AR) information associated with one or more objects in the first image based at least in part on the probability map, and displaying the AR information with the first image.

In another example, this disclosure describes a handheld device comprising a first camera oriented to capture a first image when the first camera is pointed outward relative to a user of the handheld device, a second camera oriented to capture a second image that includes eyes of the user when the first camera is pointed outward relative to the user, an AR unit that generates a probability map based on the eyes of the user in the second image, and generates AR information associated with one or more objects in the first image based at least in part on the probability map, and a display that displays the AR information with the first image.

In another example, this disclosure describes a device comprising means for capturing a first image with a handheld device, means for capturing a second image with the handheld device, wherein the second image includes eyes of the user and wherein the first and second images are captured substantially simultaneously, means for generating a probability map based on the eyes of the user in the second image, means for generating AR information associated with one or more objects in the first image based at least in part on the probability map, and means for displaying the AR information with the first image.

The techniques described in this disclosure may be implemented at least in partially in hardware, possibly using aspects of software or firmware in combination with the hardware. If implemented partially in software or firmware, the software or firmware may be executed in one or more hardware processors, such as a microprocessor, application specific integrated circuit (ASIC), field programmable gate array (FPGA), or digital signal processor (DSP). The software that executes the techniques may be initially stored in a computer-readable medium and loaded and executed in the processor.

Accordingly, this disclosure also contemplates a computer-readable storage medium comprising instructions that upon execution by a processor cause the processor to upon receiving a first image from a first camera of a handheld device, the first camera being pointed outward relative to a user of the handheld device, and upon receiving a second image using a second camera of the handheld device, wherein the second image includes eyes of the user, generate a probability map based on the eyes of the user in the second image, generate AR information associated with one or more objects in the first image based at least in part on the probability map, and output the AR information to a display.

In another example, this disclosure describes an apparatus, which may be a processor used to implement the AR unit described herein. Upon receiving a first image from a first camera of a handheld device, the first camera being pointed outward relative to a user of the handheld device, and upon receiving a second image using a second camera of the handheld device, wherein the second image includes eyes of the user, the apparatus may be configured to generate a probability map based on the eyes of the user in the second image, generate AR information associated with one or more objects in the first image based at least in part on the probability map, and output the AR information to a display.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

FIG. 5 is a diagram illustrating a combined probability map based on the first and second probability maps of FIGS. 4A and 4B.

DETAILED DESCRIPTION

This disclosure describes techniques that can improve and possibly accelerate the generation of augmented reality (AR) information with respect to objects that appear in images of a video sequence. The techniques of this disclosure may involve the capture and use of images of one or more eyes of a user of a video device. The video device may include two different cameras so that a video sequence of a scene can be captured contemporaneously with a video sequence of the eyes of the user of the device that is viewing the same scene. A first camera may be oriented to capture a sequence of images (e.g., a video sequence) outward from a user. A second camera may be oriented to capture images of the eyes of the user when the first camera captures images outward from the user. The eyes of the user, as captured by one or more images of the second camera, may be used to generate a probability map, and the probability map may be used to prioritize specific objects in the first image or specific areas or tiles within the first image for AR processing. In this way, the attention of the user (e.g., as defined by the position or direction of the eyes of the user) may provide information that can improve AR processing, e.g., focusing the AR processing on objects of interest based on the eyes of the user.

According to the techniques of this disclosure, object identification algorithms may be defined so as to prioritize areas of the captured video sequence of the first camera based on the eyes of a user as captured by the second camera. In this way, the direction of the eyes of the user can provide feedback that can improve the ability to quickly identify objects of interest within a captured video sequence. A priority map may be generated based on the eyes of the user in the images captured by the second camera. In some cases, two priority maps may be generated based on the images captured by the first camera and images captured by the second camera (which include the user's eyes). In this case, the two priority maps may be combined into a combined priority map, which may be used to prioritize AR processing with respect to areas of the captured video sequence of the first camera.

Figure 1:
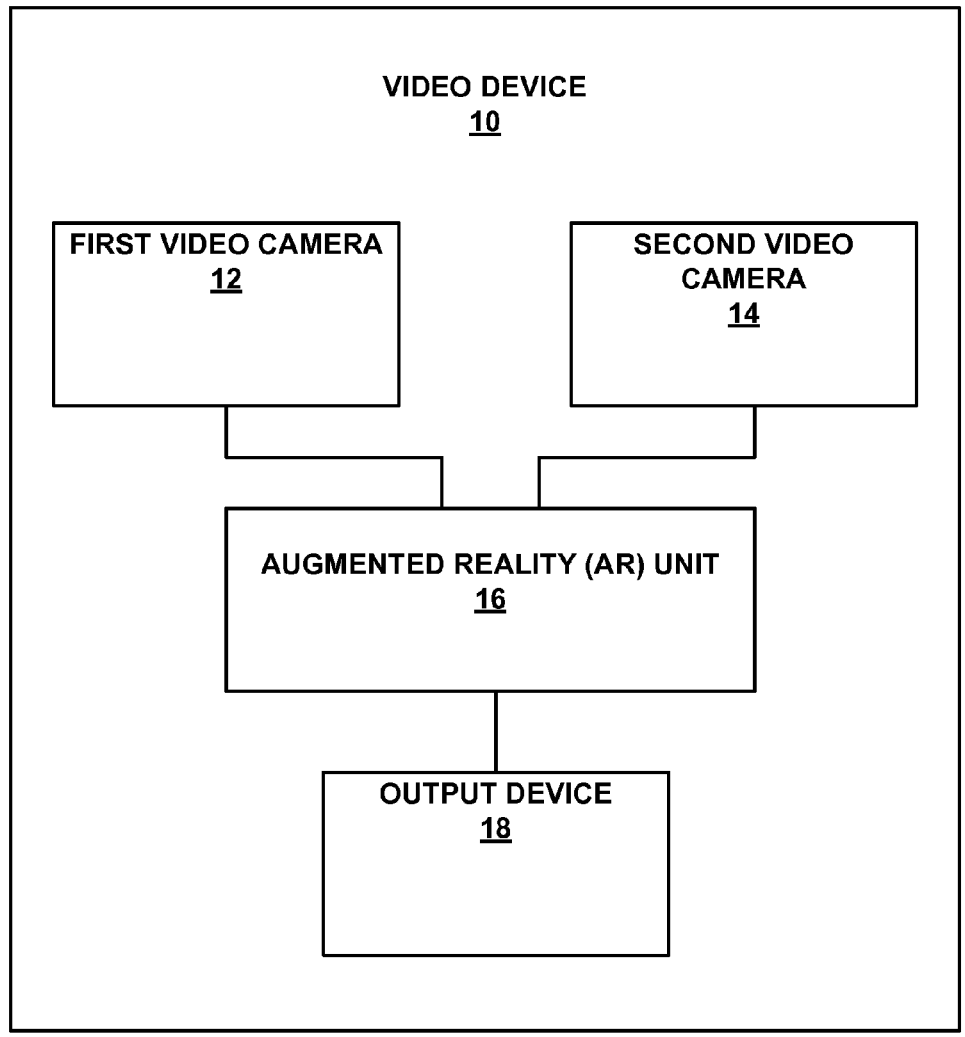
FIG. 1 is a block diagram illustrating an exemplary video device consistent with this disclosure.

FIG. 1 is a basic block diagram illustrating an exemplary video device 10 that includes two cameras consistent with this disclosure. Video device 10 may be implemented in a handheld device (e.g., a handset), such as a cellular telephone that includes two cameras. Alternatively, video device 10 may be implemented as another type of handheld device, such as a smartphone, a tablet computer, a laptop computer, a personal gaming device, a digital camera, or another hand-held device that include two cameras, and displays AR information to the user in real time.

As shown in FIG. 1, video device 10 includes two different video cameras (first video camera 12 and second video camera 14), which are used to capture two different video sequences at substantially the same time. Each captured video sequence comprises a sequence of images (sometimes called a sequence of video frames). The term "frame" and the term "image" are generally used interchangeably in this disclosure to refer to an image frame of a video sequence, although the techniques could also be applied to still images.

The images of the first video sequence may be time-synchronized with the images of the second video sequence, meaning that first camera 12 may capture successive images contemporaneously with the images captured by second cameras 14. Any given instance of time may have an associated image from first camera 12 and an associated image from second camera 14, although it could be possible to apply different frame rates for first camera 12 and second camera 14, in which case the frames of the slower frame rate camera may correspond every Nth frame of the higher frame rate camera, where N is an integer. In any case, the eyes of the user within images captured by second camera 14 may provide video device 10 with information about areas of interest to the user with respect to images captured by first camera 12.

First video camera 12 is generally pointed outward from a user in order to capture an outward video sequence in a normal fashion, e.g., such that first video camera 12 generally captures the same view that the user sees. Second video camera 14 may be oriented to capture a video sequence that includes the user's eyes when first video camera 12 is oriented outward relative to the user. Accordingly, first video camera 12 and second video camera 14 may be oriented in generally opposite directions, e.g., oriented approximately 180 degrees relative to one another. Other orientations may also work as long as the second camera captures the eyes of the user and the first camera captures images associated with the view of the user. Due to the opposite orientation of the different cameras, it may be desirable to "mirror" images from one of the cameras so that images from the two different cameras align from a common perspective. However, mirroring is not necessarily required.

Augmented reality (AR) unit 16 may operate with respect to individual images or sequences from first video camera 12 and second video camera 14. The first images from first video camera 12 and the second images from second video camera 14 may correspond to the same time instances. Accordingly, the eyes of the user, as captured by second video camera 14, may be used to aid in the analysis of the first images captured by first video camera 12. The eyes of the user may define a position (e.g., a position of the pupil) that indicates a direction of attention. In some cases, the eye movements across video frames, or the eye focus (as determined by the direction and possibly the size of pupils of the user) may be used to define the direction of attention. AR unit 16 may comprise hardware, such as a processor or discrete logic components. In some cases, AR unit 16 may implement software in combination with hardware.

AR unit 16 may perform AR processing with respect to the first video sequence captured by first video camera 12, and may generate AR information that can be overlayed on the first video sequence. The AR processing performed by AR unit 16 may include object identification algorithms or other AR processing techniques used to create or identify AR information or objects in a video sequence. The AR information may comprise graphical information, textual information, labels, or any information that identifies or modifies objects that are captured in the first video sequence.

The AR processing performed by AR unit 16 may comprise object matching techniques in which objects within the first video sequence are compared to template objects, which may be stored in a library. A memory (not shown) either within AR unit 16 or accessible to AR unit 16 may store the library of templates and information about such templates. If AR unit 16 determines that an object in the first video sequence sufficiently matches a specific template object, the information about the template object may be attributed to the object in the first video sequence. AR unit 16 may perform object comparisons, object shape comparisons, color or luminance comparisons, or other types of comparisons in order to determine whether a given object matches one of the template objects stored or accessible by AR unit. AR processing may also include facial recognition techniques, biometric recognition techniques, or other techniques to identify objects (which could be one or more specific people) in the first video sequence.

In order to aid in the object identification process, AR unit 16 may utilize the information provided by the user's eye position, direction, movements or focus (which are captured by second video camera 14). Since the user may direct his or her gaze at objects of interest, the user's eye position (and possibly movement and focus) can help AR unit 16 in prioritizing areas of the first image for object identification. For example, if the images in the first video sequence include many objects, but the user's eyes demonstrate attention to the upper-left area of the video sequence, then this upper-left area may be given priority in the object identification techniques. Given a limited amount of processing capabilities, limited power, and limited time, the use of the eyes of the user (as captured by second video camera 14) may improve object identification techniques with respect to the first video sequence captured by first video camera 12.

First video camera 12 may capture a first image (or a first sequence of images), and first video camera 12 may be pointed outward relative to a user of video device 10. Second video camera 14 may capture a second image (or a second sequence of images), and the second video camera may be oriented to capture the eyes of the user when the first video camera 12 is pointed outward relative to the user.

AR unit 16 may generate a probability map based on the eyes of the user in the second image, and may generate AR information associated with one or more objects in the first image based at least in part on the probability map. Output device 18 may then display the AR information with the first image.

As described in greater detail below, the probability map may include a plurality of tiles, although the techniques of this disclosure are not necessarily limited to a tile-based approach. If tile-based probability maps are used, one or more tiles of the probability map may be given the higher priority than other tiles based at least in part on the eyes of the user in the second image. In some cases, AR unit 16 may generate a first probability map based on the one or more objects in the first image, and generate a second probability map, wherein the second probability map is the probability map that is based on the eyes of the user in the second image. In this case, AR unit 16 may also generate a combined probability map based on the first and second probability maps, and generate the AR information based on the combined probability map. Generating the AR information based on the combined probability map may include prioritizing different objects in the first image based on the combined priority map and performing object identification of the different objects based on a prioritization of the different objects.

The first probability map may define one or more areas in the first image that have a higher probability of including an object of interest than other areas in the first image, and the second probability map may define one or more areas that, based on the users eyes, have a higher probability of user interest relative to other areas in the first image. Since first video camera 12 and second video camera 14 may be oriented in opposite directions, it may be helpful or desirable to align images of first video camera 12 and second video camera 14 from a common perspective. Thus, AR unit 16 may also generate a mirrored version of at least one of the first or second images so that the first and second images align from a common perspective, wherein at least one of the first and second probability maps is generated based on the mirrored version.

Again, the first and second images captured by first video camera 12 and second video camera 14 may be time-synchronized, meaning that the two different images may correspond to a substantially similar instance of time. AR unit 16 may perform AR processing substantially in real-time, and the AR processing may be repeated for every image of a first sequence of images and a second sequence of images, wherein the first sequence of images are time-synchronized with the second sequence of images. However, to further save power and accelerate the processing, in some cases, AR unit 16 may perform AR processing for every Nth image of a first sequence of images and every Nth image of a second sequence of images, wherein the first sequence of images are time-synchronized with the second sequence of images, and wherein N represents an integer greater than or equal to 2.

In addition, AR unit 16 does not necessarily need to perform the AR processing on an image-by-image basis. In other examples, the AR processing by AR unit 16 may occur with respect to sequences of images over a window of time, e.g., a sliding window. In this case, first video camera 12 may capture a first sequence of images, and second video camera 14 may capture a second sequence of images, wherein the second sequence of images includes the eyes of the user. AR unit 16 may generate a plurality of probability maps based on the eyes of the user in the second sequence of images, and may generate the AR information based at least in part on the plurality of probability maps. Output device 18 may then display the AR information with the first sequence of images.

Figure 2:
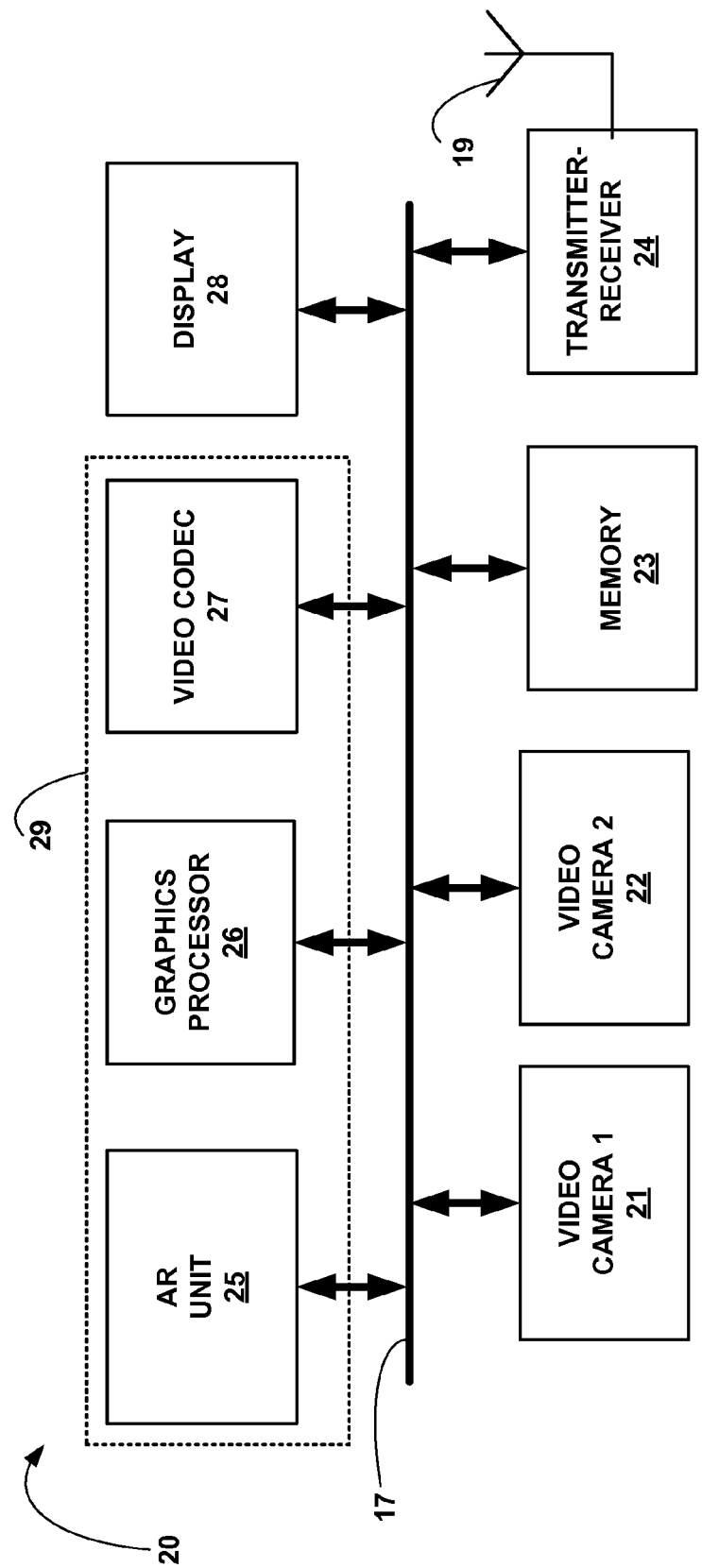
FIG. 2 is a block diagram illustrating an exemplary video device consistent with this disclosure.

FIG. 2 is a more detailed block diagram illustrating one exemplary video device 20 consistent with this disclosure. In this example (similar to the example of FIG. 1), video device 20 includes a first video camera 21, a second video camera 22, an AR unit 25, and a display 28 (which is an output device that can display the AR information). These units may operate similar to first video camera 12, second video camera 14, AR unit 16 and output device 18 explained above with respect to video device 10 of FIG. 1.

In the example of FIG. 2, video device 20 may also include additional components, such as a graphics processor 26 that performs graphics processing on captured video sequences, and a video codec 27 (encoder-decoder) that may encode or decode captured or received video information. Video codec 27, for example, may encode or decode video sequences according to a video coding standard, such as the ITU H.264 standard, or one of the MPEG standards. AR unit 25, graphics processor 26 and video codec 27 may be implemented as one or more processors 29. Separate processors could be used for these different units, or the same processor could possibly implement two or more of units 25, 26 and 27.

Video device 20 may also include a memory 23 to store data, which may include video sequences. Memory 23 may store raw video sequences captured by video cameras 21 and 22, in which case, AR unit 25 may access the stored video sequences in memory 23 in order to perform the AR processing described herein. In addition, memory 23 may also store a library of template objects used by AR unit 25 in the AR processing. Memory 23 may also store processed video sequences output by graphics processor 26 or encoded video sequences output by video codec 27. Internal memory could also be incorporated into the one or more processors 29 to accelerate the processing of AR unit 25, graphics processor 26 or video codec 27. In some cases, memory 23 might also be used to store computer-readable instructions executed by AR unit 25 to perform the techniques of this disclosure.

Video device 20 may also include a transmitter-receiver 24 that facilitates wireless communication with other devices via antenna 19. Transmitter-receiver 24 may operate according to any of a wide range of wireless protocols, such as code division multi access (CDMA) or other wireless protocols. Transmitter-receiver 24 may include a modem that modulates and demodulates data according to CDMA. Other exemplary wireless technologies that may be used by transmitter-receiver 24 may include the global system for mobile communications (GSM) system, frequency division multiple access (FDMA), time division multiple access (TDMA), orthogonal frequency division multi-access (OFDM), Bluetooth, one or more of the IEEE 802.11 protocols, ultra wideband communication protocols, or any other communication technique, standard or combinations thereof.

A system bus 17 may communicatively couple the different components or units of video device 20. However, separate buses, or other wired or wireless interfaces could be used between different components or units, depending on the implementation. In the example of FIG. 2, video device 20 may correspond to a wireless communication device, such as a wireless cellphone or smartphone. Many processing components, such as audio processing components, are not illustrated in FIG. 2 for simplicity.

Again, according to this disclosure, AR unit 25 may perform AR processing with respect to the first video sequence captured by first video camera 21, and may generate AR information that can be overlayed on the first video sequence. The AR processing performed by AR unit 25 may comprise object matching techniques in which objects within the first video sequence are compared to template objects, which may be stored in a library of memory 23. AR unit 25 may perform object comparisons, object shape comparisons, color or luminance comparisons, or other types of comparisons in order to determine whether a given object matches one of the template objects. As mentioned, AR processing may also include facial recognition techniques, biometric recognition techniques, or other techniques to identify objects (which could be one or more specific people) in the first video sequence.

The generated AR information may be used to supplement a wide array of different types of information displayed by video device 20. The AR information may comprise advertising material about objects, labels of objects or people, directions, military identifiers, emergency information, prospecting or speculative information about a setting or location, architectural information, sight-seeing information, collaborative information for a particular group of collaborators, entertainment or educational information about objects or persons, virtual "x-ray" views inside of objects, musical labels or identifiers, information to aid physically disabled persons, or any type of information that can be generated and overlaid on an image or scene. As another example, the AR information may be virtual reality information.

In order to aid in the object identification process, AR unit 25 may utilize the information provided by the position or pupil direction of the eyes of the user (which are captured by second video camera 22). First video camera 21 may capture a first image (or a first sequence of images), and first video camera 21 may be pointed outward relative to a user of video device 20. Second video camera 22 may capture a second image (or a second sequence of images), and the second video camera may be oriented to capture the eyes of the user when the first video camera 21 is pointed outward relative to the user. AR unit 25 may generate a probability map based on the eyes of the user in the second image (or the second sequence of images), and may generate AR information associated with one or more objects in the first image (or the first sequence of images) based at least in part on the probability map. Display 28 may then display the AR information with the first image (or the first sequence of images). Display 28 may comprise a viewfinder of video device 20, or any display viewable by the user in real-time, although the techniques of this disclosure are not limited to any specific display and may be applicable to some applications that do not display imagery in real-time.

In some examples, the probability map may include a plurality of tiles, and one or more tiles of the probability map may be given the higher priority than other tiles based at least in part on the eyes of the user in the second image. Furthermore, in some cases, AR unit 25 may generate a first probability map based on the one or more objects in the first image, and generate a second probability map, wherein the second probability map is the probability map that is based on the eyes of the user in the second image. When AR unit 25 generates first and second probability maps, AR unit 25 may also generate a combined probability map based on the first and second probability maps, and generate the AR information based on the combined probability map. Generating the AR information based on the combined probability map may include prioritizing different objects in the first image based on the combined priority map and performing object identification of the different objects based on a prioritization of the different objects. Given a prioritization of objects, such objects may be processed in the order of prioritization. In some cases, however, lower priority objects may be skipped and not processed if the processing capabilities are insufficient to process all of the objects.

The first probability map may define one or more areas in the first image that have a higher probability of including an object of interest than other areas in the first image, and the second probability map may define one or more areas that, based on the users eyes, have a higher probability of user interest relative to other areas in the first image. Since first video camera 21 and second video camera 22 may be oriented in opposite directions, it may be helpful or desirable to align images of first video camera 21 and second video camera 22 from a common perspective. Thus, AR unit 25 may also generate a mirrored version of at least one of the first or second images so that the first and second images align from a common perspective, wherein at least one of the first and second probability maps is generated based on the mirrored version.

Figure 3A:
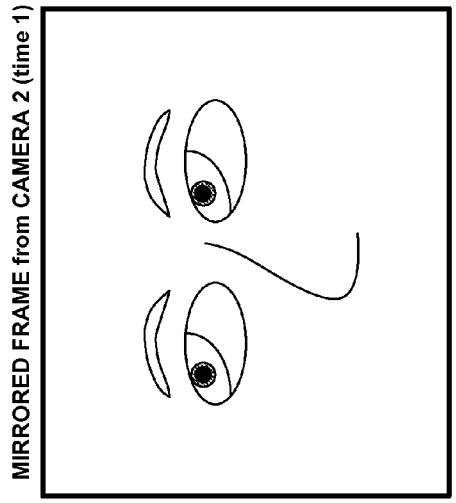
FIG. 3A is a conceptual diagram illustrating a frame captured by a first camera that is oriented to capture images of scenery outward from a user.

FIGS. 3A-3D are conceptual diagrams that will be described from the perspective of video device 10 of FIG. 1, although the following discussion may also apply to other devices. FIG. 3A is a conceptual diagram illustrating a frame (i.e., an image) captured by first camera 12 that is oriented outward relative to a user. The frame from the first camera 12 shown in FIG. 3A may correspond to a particular time (i.e., time 1).

Figure 3B:
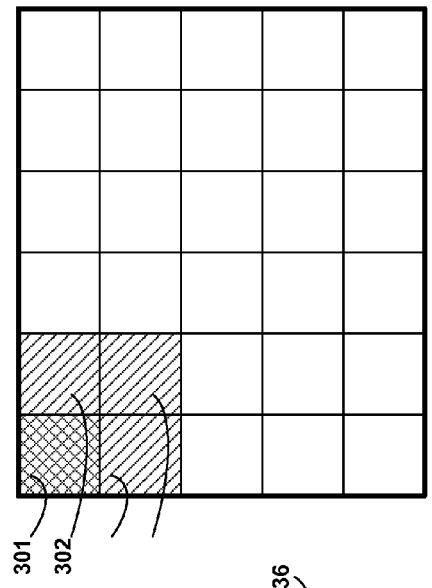
FIG. 3B is a conceptual diagram illustrating a mirrored version of a frame captured by a second camera that is oriented to capture images of the eyes of a user.

FIG. 3B is a conceptual diagram illustrating a mirrored version of a frame captured by second camera 14 that is oriented to capture the eyes of a user. The mirrored version of the frame captured by second camera 14, as shown in FIG. 3B may be generated by AR unit 16 so that the first and second frames shown in FIGS. 3A and 3B align from a common perspective. This mirroring may not be required in all cases, but since first camera 12 and second camera 14 generally point in opposite directions, the mirrored version of the frame captured by second camera 14 (shown in FIG. 3B) ensures that the eyes of the user are illustrative of the direction of focus relative to the frame captured by first camera 12 (shown in FIG. 3A). The processing order of the images (i.e., the order in which pixels are processed) could also be used to account for the different orientations of images, without actually requiring the generation of minor images. The mirrored version of the second image, however, can help to conceptualize how the eyes of the user help to locate areas of interest or objects of interest in the outwardly captured images from the first camera.

Figure 3C:
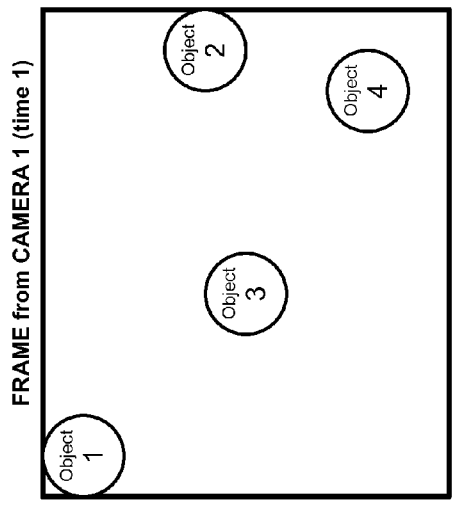
FIG. 3C is a conceptual diagram illustrating a tiled version of the image from the first camera.

FIG. 3C is a conceptual diagram illustrating a tiled version of a frame from the first camera. The level of tiling may vary in different examples, so FIG. 3C is merely exemplary. In this example, tile 31 includes object 1. Tile 32 includes object 3. Tiles 33 and 34 each include a portion of object 2. Object 4 is located within the frame such that portions of object 4 are located within tiles 35, 36, 37 and 38.

Figure 3D:
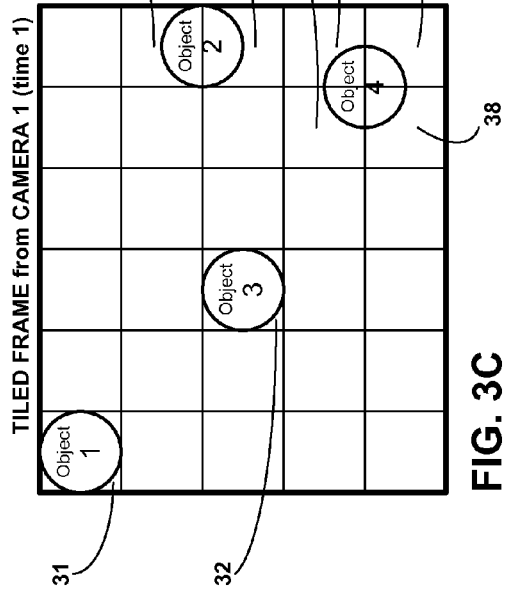
FIG. 3D is a conceptual diagram illustrating a tiled approximation of the mirrored version of the image from the second camera with shading to show likely areas of interest, based on one or more eyes of the user in the image of FIG. 3B.

FIG. 3D is a tiled approximation of the mirrored version of the frame from second camera 14 with shading to show likely areas of interest, based on the users eyes in the image of FIG. 3B. In this example, tile 301 has shading that may indicate a very high likelihood that the eyes of the user are positioned toward, oriented toward, directed to, or otherwise focused on, tile 301. Tiles 302, 303 and 304, which are adjacent to tile 301 may also have shading to indicate a medium likelihood that the eyes of the user are positioned toward, oriented toward, directed to, or otherwise focused on, tiles 303, 302 or 304. The remaining tiles lack any shading, indicating that the remaining tiles are less likely to include objects that interest the user.

Figures 4A, 4B:
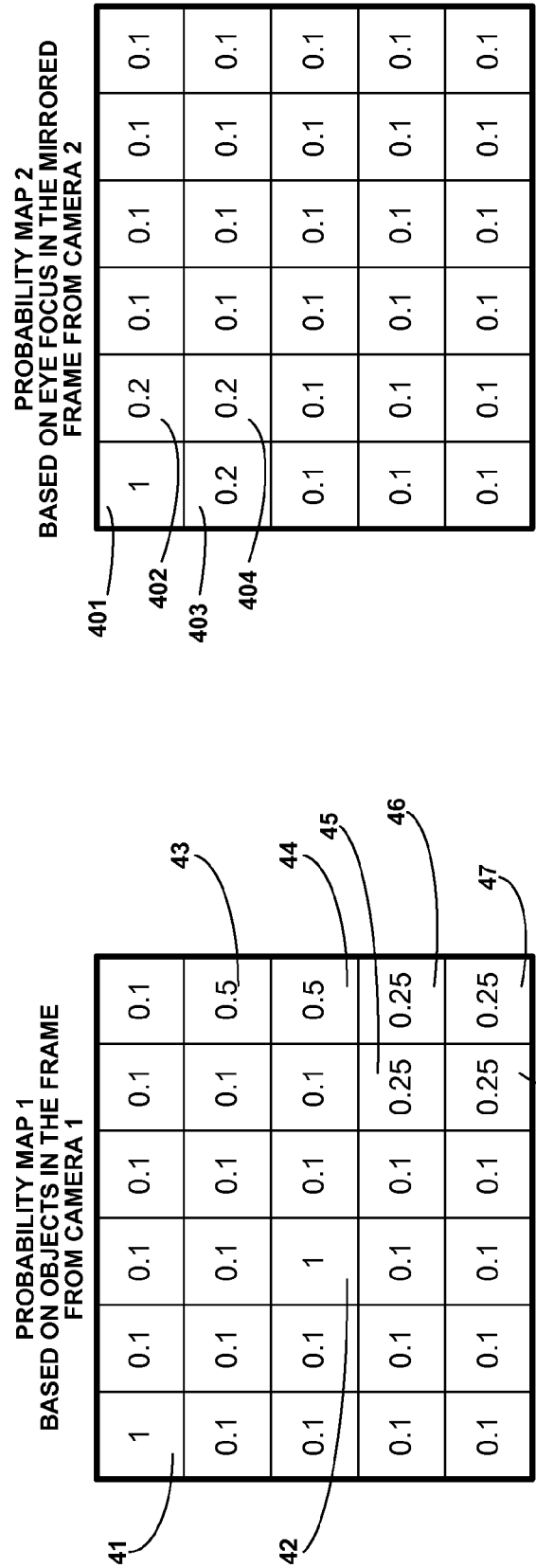
FIG. 4A is a diagram illustrating an exemplary first probability map based on the tiled image of FIG. 3C from the first camera.
FIG. 4B is a diagram illustrating an exemplary second probability map based on the tiled approximation of the mirrored version of the image from the second camera.

FIG. 4A is an exemplary first probability map based on the tiled frame of FIG. 3C from first camera 12. In this case, different areas may be assigned different priorities based on the likelihood that such areas include objects that will be objects of interest for the AR processing. In this example, the areas 41 and 42 may be given a high priority (e.g., 1.0) since these areas are associated with tiles that each include a full object. Areas 43 and 44 may be given a medium priority (e.g., 0.5) since these areas are associated with tiles that each include half of an object. Areas 45, 46, 47 and 48 may be given a lower priority (e.g., 0.25) since these areas are each associated with tiles that include less than half of an object, and the remaining areas may be given a lowest priority (e.g., 0.1) since the remaining areas do not seem to include any objects or partial objects.

FIG. 4B is an exemplary second probability map based on the mirrored version of the frame of FIG. 3C from second camera 14. In accordance with one example of this disclosure, the probability map of FIG. 4B may be used to prioritize areas of interest for AR processing by AR unit 16. In this case, area 401 may be given a high priority (e.g., 1), areas 402, 403 and 404 may be given a lower priority (e.g., 0.2), and the remaining areas may be given a lowest priority (e.g., 0.1). Since the probability map of FIG. 4B is based on the eyes of the user at a given time (as captured by second camera 14), this probability map can help to prioritize the AR processing of objects in the outward image at that time (as captured by first camera 12). For example, the tile of the first image corresponding to the area 401 may be processed first, followed by the tiles of the first image corresponding to the areas 402, 403 and 404. If remaining processing capabilities and power were available, then the remaining tiles associated with the remaining areas of the probability map could be processed.

In some cases, it may be desirable to combine the probability maps of FIGS. 4A and 4B to define a combined probability map. In this way, information about the eyes of the user may be combined with information that identifies areas that are likely to have objects, which may be objects of interest. FIG. 5 illustrates a combined probability map based on the first and second probability maps of FIGS. 4A and 4B. The probabilities of the first probability map in FIG. 4A may be multiplied with the probabilities of the second probability map in FIG. 4B in order to generate the combined probability map of FIG. 5. This results in a range of priority values for different tiles, which combine information about the eyes of the user with information that identifies areas that are likely to have objects.

In the combined probability map of FIG. 5, the area 51 has a priority of 1, which is the highest possible priority in this example. The area 55 has the next highest priority with a priority of 0.1. The areas 56 and 57 have priorities of 0.05 and the areas 58, 59, 61 and 62 have priorities of 0.025. The areas 52, 53 and 54 have priorities of 0.02. The remaining areas may have probabilities of 0.01.

The corresponding tiles of the image captured by the first camera (e.g., the tiled image shown in FIG. 3C may be processed by AR unit 16 in the order of priorities assigned by the combined probability map. In this case, tile 31 is processed first since the probability of area 51 has the highest value (i.e., 1) in the combined probability map of FIG. 5. Tile 32 is processed next by AR unit 16 based on the priority value 0.1 in the area 55. Next, tiles 33 and 34 are processed by AR unit 16 based on the priority value 0.05 in areas 56 and 57. Next, tiles 35, 36, 37 and 38 are processed by AR unit 16 based on the priority value 0.025 in areas 58, 59, 61 and 62. Next, the tiles adjacent to tile 31 in FIG. 3C are processed by AR unit 16 based on the priority value 0.02 in areas 52, 53 and 54. Finally, any remaining tiles associated with the remaining areas of the probability map can be processed. In this way, priority is given to different areas based on combined factors of the eyes of the user (as defined and captured in the second image) and likely areas where objects exist (as defined by the first image).

Figure 6:
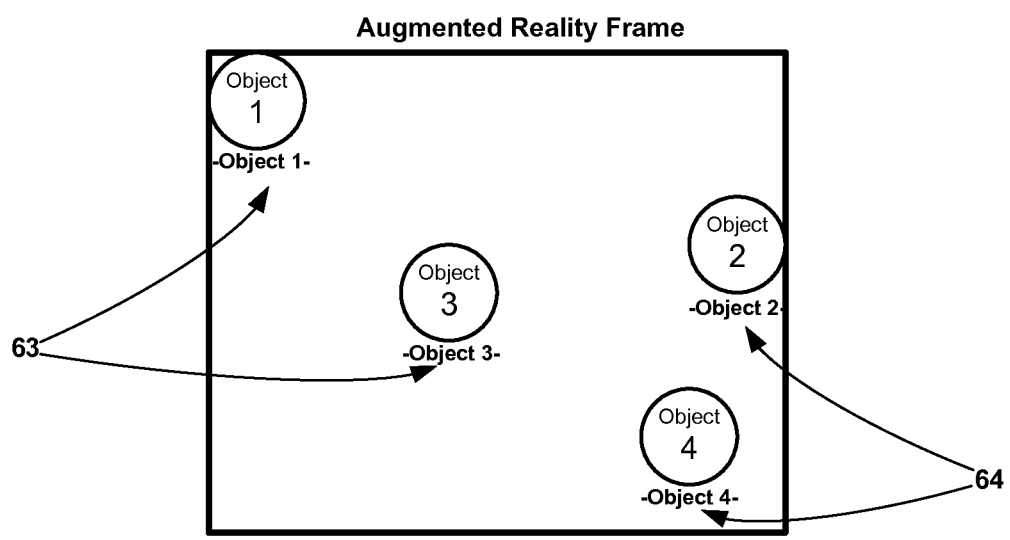
FIG. 6 is a conceptual diagram illustrating an image with AR information added below each object.

FIG. 6 is a conceptual diagram illustrating an image with AR information added below each object. For example, AR information 63 and 64 may be overlaid on the original frame from the first camera so that that the different objects are identified. Although AR information 63 and 64 is illustrated as simple textual labels, the AR information may take other forms, including graphical information such as icons or images, textual information, labels, or any information that identifies or modifies objects captured in the first image or the first sequence of images. As an illustration, the names of persons, or the names or addresses of buildings could be generated as AR information and overlaid on the respective objects. AR information could be generated for any type of object, although it may be desirable to limit the amount of AR information for any given image. The prioritization techniques of this disclosure may be used to limit AR information, even for cases where processing capabilities do not limit the amount of AR processing that could be performed.

Consistent with the techniques of this disclosure, generation of AR information 63 may be more likely than generation of AR information 64. This should be apparent from the combined probability map of FIG. 5, where areas 51 and 55 have higher priority values than areas 56, 57, 58, 59, 61 and 62. The higher priority areas may be processed before lower priority areas, and therefore, given a limited amount of power, time or processing capabilities, the corresponding areas of an image that correspond to the higher priority areas of the probability map may be more likely to be overlaid with AR information. In this example, the area around object 1 has the highest priority due to the combined probability of an object being there (as defined in the first probability map of FIG. 4A) and the high probability assigned based on the eyes of the user (as defined in the second probability map of FIG. 4B.

Figure 7:
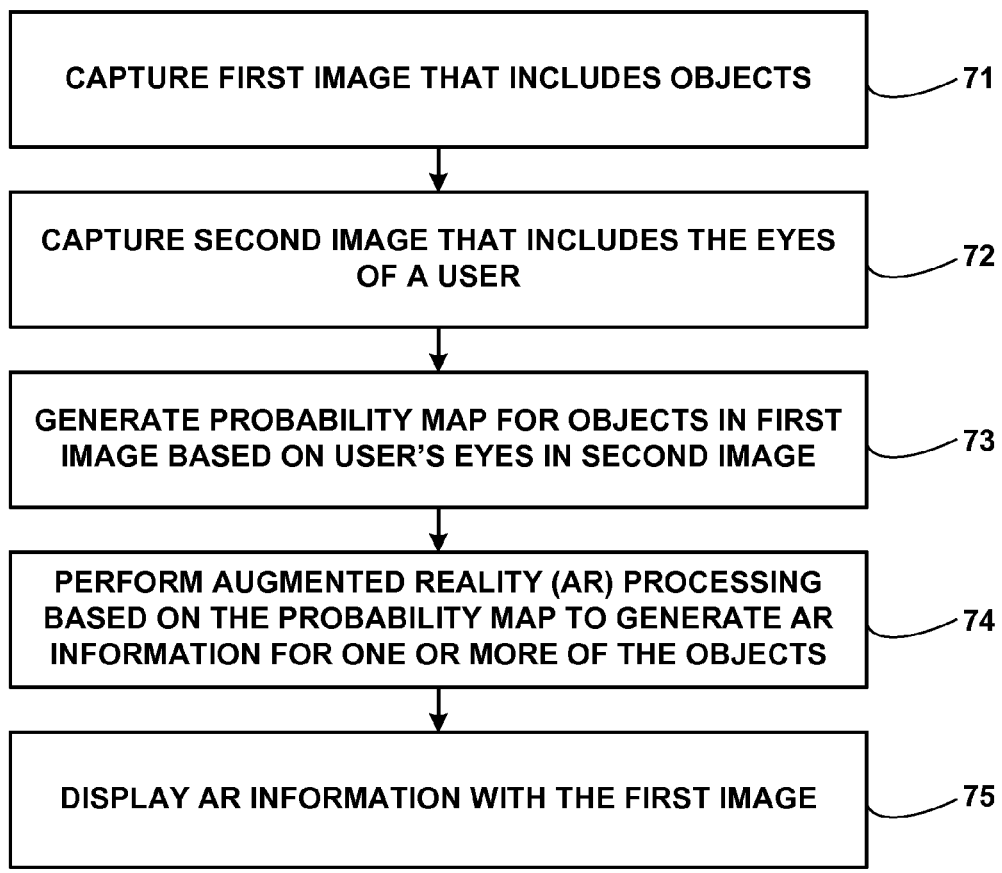
FIGS. 7 and 8 are flow diagrams illustrating exemplary techniques for generating and displaying AR information consistent with this disclosure.

FIG. 7 is a flow diagram illustrating an exemplary technique for generating and displaying AR information consistent with this disclosure. As shown in FIG. 7, first video camera 12 captures a first image that includes objects (71), and second video camera 14 captures a second image that includes the eyes of a user (72). AR unit 16 receives the first and second images and generates a probability map for objects in the first image based on the eyes of the user in the second image (73). AR unit 16 then performs AR processing based on the probability map to generate AR information for one or more of the objects in the first image (74). The AR processing, for example, may include object comparisons, object shape comparisons, color or luminance comparisons, or other types of comparisons in order to determine whether a given object matches one of the template objects stored or accessible by AR unit 16. AR processing may also include facial recognition techniques, biometric recognition techniques, or other techniques to identify objects (which could be one or more specific people) in the first image. Once AR unit 16 generates the AR information, output device 18 can display the AR information with the first image, e.g., by overlaying the AR information over the one or more objects in the first image.

Figure 8:
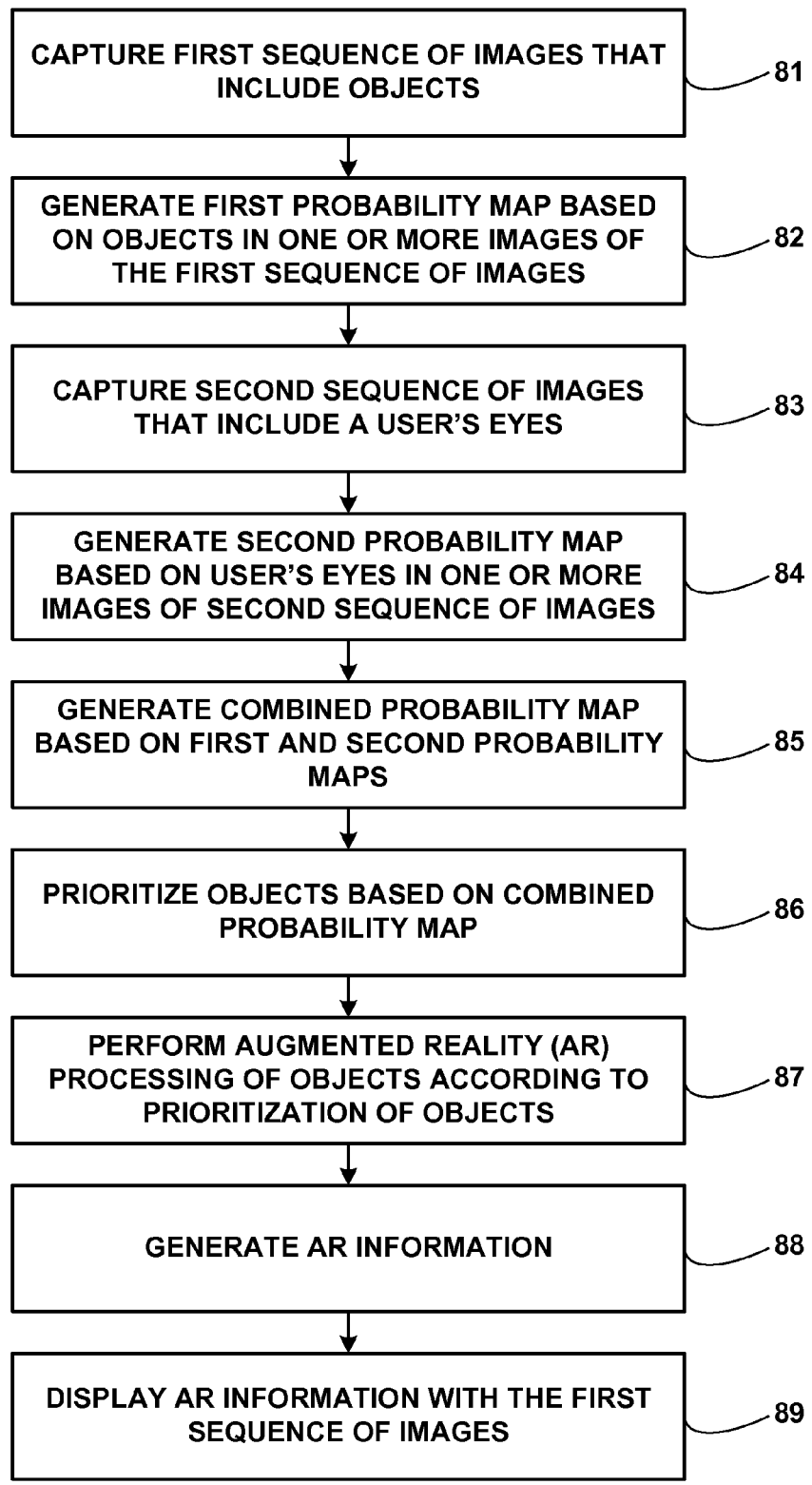

FIG. 8 is a flow diagram illustrating another exemplary technique for generating and displaying AR information consistent with this disclosure. As shown in FIG. 8, first video camera 12 captures a first sequence of images that includes objects (81). AR unit 16 receives the first sequence of images from first video camera 12 and generates a first probability map based on the objects in one or more images of the first sequence of images (82). At substantially the same time, second video camera 14 captures a second sequence of images that includes eyes of the user (83). AR unit 16 also receives the second sequence of images from second video camera 14 and generates a second probability map based on the eyes of the user in one or more images of the second sequence of images (84). As mentioned, it may be possible to use different sampling rates for the first and second cameras, in which case, the AR processing of this disclosure may occur with respect to outward images that have corresponding images of the user's eyes at the same time instances as the outward images.

AR unit 16 generates a combined probability map based on the first and second probability maps (85), e.g., combining probabilities of the first probability map with those of the second probability map. For example, the probabilities of the first probability map may be multiplied with those of the second probability map in order to generate the different probabilities of the combined probability map. However, in some cases, either the first or the second probability map may be given more weight in the combined probability map.

AR unit 16 next prioritizes the objects in the first sequence of images based on the combined probability map (86), and performs AR processing of the different objects according to the prioritization of objects (87). This means AR unit 16 processes objects that are given higher priority or objects located in areas of the probability map that have higher priority before AR unit 16 processes other objects that are assigned lower priority or other objects located in areas of the probability map that have lower priority. AR unit 16 generates AR information (88) for different objects, generally following the prioritization scheme to define the order of object processing. Once AR unit 16 generates the AR information, output device 18 can display the AR information with the first image (89), e.g., by overlaying the AR information over the one or more objects in the first image.

The techniques of this disclosure may be implemented in a wide variety of devices or apparatuses, including a wireless communication device handset such as a mobile phone, an integrated circuit (IC) or a set of ICs (i.e., a chip set). Any components, modules or units have been described provided to emphasize functional aspects and does not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

If implemented in software, the techniques may be realized at least in part by a computer-readable medium comprising instructions that, when executed in a processor, performs one or more of the methods described above. The computer-readable medium may comprise a tangible computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The instructions may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video codec. Also, the techniques could be fully implemented in one or more circuits or logic elements.

The disclosure also contemplates any of a variety of integrated circuit devices that include circuitry to implement one or more of the techniques described in this disclosure. Such circuitry may be provided in a single integrated circuit chip or in multiple, interoperable integrated circuit chips in a so-called chipset. Such integrated circuit devices may be used in a variety of applications, some of which may include use in wireless communication devices, such as mobile telephone handsets.

Various examples have been described in this disclosure. These and other examples are within the scope of the following claims.

The invention claimed is:

1. A method comprising:
capturing a first image using a first camera of a handheld device, the first camera being pointed outward relative to a user of the handheld device;
capturing a second image using a second camera of the handheld device, wherein the second image includes eyes of the user;
generating a probability map based on the eyes of the user in the second image, wherein the probability map includes a plurality of tiles, and one or more tiles of the probability map are given the higher priority than other tiles based at least in part on the eyes of the user in the second image;
generating augmented reality (AR) information associated with one or more objects in the first image based at least in part on the probability map; and
displaying the AR information with the first image.

2. The method of claim 1, wherein the first and second images are time-synchronized.

3. The method of claim 1, further comprising repeating the method for every image of a first sequence of images and a second sequence of images, wherein the first sequence of images are time-synchronized with the second sequence of images.

4. The method of claim 1, further comprising repeating the method for every Nth image of a first sequence of images and every Nth image of a second sequence of images, wherein the first sequence of images are time-synchronized with the second sequence of images, and wherein N represents an integer greater than or equal to 2.

5. The method of claim 1, wherein the method is performed by a handheld device that includes the first camera, the second camera, and a display.

6. The method of claim 1, wherein the method is performed in real-time.

7. The method of claim 1, further comprising:
capturing a first sequence of images using the first camera,
capturing a second sequence images using the second camera, wherein the second sequence of images includes the eyes of the user;
generating a plurality of probability maps based on the eyes of the user in the second sequence of images;
generating the AR information based at least in part on the plurality of probability maps; and
displaying the AR information with the first sequence of images.

8. A method comprising:
capturing a first image using a first camera of a handheld device, the first camera being pointed outward relative to a user of the handheld device;
capturing a second image using a second camera of the handheld device, wherein the second image includes eyes of the user;
generating a first probability map based on the one or more objects in the first image;
generating a second probability map, wherein the second probability map is the probability map that is based on the eyes of the user in the second image;
generating a combined probability map based on the first and second probability maps;
generating augmented reality (AR) information associated with one or more objects in the first image based at least in part on the combined probability map; and
displaying the AR information with the first image.

9. The method of claim 8, wherein generating the AR information based on the combined probability map includes prioritizing different objects in the first image based on the combined priority map and performing object identification of the different objects based on a prioritization of the different objects.

10. The method of claim 8,
wherein the first probability map defines one or more areas in the first image that have a higher probability of including an object of interest than other areas in the first image; and
wherein the second probability map defines one or more areas that, based on the users eyes, have a higher probability of user interest relative to other areas in the first image.

11. The method of claim 10, further comprising generating a mirrored version of at least one of the first or second images so that the first and second images align from a common perspective, wherein at least one of the first and second probability maps is generated based on the mirrored version.

12. A handheld device comprising:
a first camera oriented to capture a first image when the first camera is pointed outward relative to a user of the handheld device;
a second camera oriented to capture a second image that includes eyes of the user when the first camera is pointed outward relative to the user;
an augmented reality (AR) unit that generates a probability map based on the eyes of the user in the second image, and generates AR information associated with one or more objects in the first image based at least in part on the probability map, wherein the probability map includes a plurality of tiles, and one or more tiles of the probability map are given the higher priority than other tiles based at least in part on the eyes of the user in the second image; and
a display that displays the AR information with the first image.

13. The handheld device of claim 12, wherein the first and second images are time-synchronized.

14. The handheld device of claim 12, wherein the AR unit repeats generation of the AR information for every image of a first sequence of images, wherein the first sequence of images are time-synchronized with a second sequence of images.

15. The handheld device of claim 12, wherein the AR unit repeats generation of the AR information for every Nth image of a first sequence of images, wherein the first sequence of images are time-synchronized with a second sequence of images, and wherein N represents an integer greater than or equal to 2.

16. The handheld device of claim 12, wherein generating the AR information occurs in real-time.

17. The handheld device of claim 12, wherein:
the first camera captures a first sequence of images,
the second camera captures a second sequence images, wherein the second sequence of images includes the eyes of the user;
the AR unit generates a plurality of probability maps based on the eyes of the user in the second sequence of images, and generates the AR information based at least in part on the plurality of probability maps; and
the display displays the AR information with the first sequence of images.

18. The handheld device of claim 12, wherein the AR unit comprises at least one of an integrated circuit and a microprocessor.

19. A handheld device comprising:
a first camera oriented to capture a first image when the first camera is pointed outward relative to a user of the handheld device;
a second camera oriented to capture a second image that includes eyes of the user when the first camera is pointed outward relative to the user;
an augmented reality (AR) unit that generates AR information associated with one or more objects in the first image; and
a display that displays the AR information with the first image,
wherein the AR unit:
generates a first probability map based on the one or more objects in the first image;
generates a second probability map based on the eyes of the user in the second image;
generates a combined probability map based on the first and second probability maps; and
generates the AR information based at least in part on the combined probability map.

20. The handheld device of claim 19, wherein in generating the AR information based on the combined probability map, the AR unit prioritizes different objects in the first image based on the combined priority map and performs object identification of the different objects based on a prioritization of the different objects.

21. The handheld device of claim 19,
wherein the first probability map defines one or more areas in the first image that have a higher probability of including an object of interest than other areas in the first image; and
wherein the second probability map defines one or more areas that, based on the users eyes, have a higher probability of user interest relative to other areas in the first image.

22. The handheld device of claim 21, wherein the AR unit generates a mirrored version of at least one of the first or second images so that the first and second images align from a common perspective, wherein at least one of the first and second probability maps is generated based on the mirrored version.

23. A device comprising:
means for capturing a first image with a handheld device;
means for capturing a second image with the handheld device, wherein the second image includes eyes of the user and wherein the first and second images are captured substantially simultaneously;
means for generating a probability map based on the eyes of the user in the second image;
means for generating augmented reality (AR) information associated with one or more objects in the first image based at least in part on the probability map, wherein the probability map includes a plurality of tiles, and one or more tiles of the probability map are given the higher priority than other tiles based at least in part on the eyes of the user in the second image; and
means for displaying the AR information with the first image.

24. The device of claim 23, wherein the first and second images are time-synchronized.

25. The device of claim 23, wherein generating the AR information is repeated for every image of a first sequence of images and a second sequence of images, wherein the first sequence of images are time-synchronized with the second sequence of images.

26. The device of claim 23, wherein generating the AR information is repeated for every Nth image of a first sequence of images and every Nth image of a second sequence of images, wherein the first sequence of images are time-synchronized with the second sequence of images, and wherein N represents an integer greater than or equal to 2.

27. The device of claim 23, wherein the device is a handheld device that includes the first camera, the second camera, and a display.

28. The device of claim 23, wherein generating the AR information occurs in real-time.

29. The device of claim 23, further comprising:
means for capturing a first sequence of images,
means for capturing a second sequence images, wherein the second sequence of images includes the eyes of the user;
means for generating a plurality of probability maps based on the eyes of the user in the second sequence of images;
means for generating the AR information based at least in part on the plurality of probability maps; and
means for displaying the AR information with the first sequence of images.

30. A device comprising:
means for capturing a first image with a handheld device;
means for capturing a second image with the handheld device, wherein the second image includes eyes of the user and wherein the first and second images are captured substantially simultaneously;
means for generating a first probability map based on the one or more objects in the first image;
means for generating a second probability map based on the eyes of the user in the second image;
means for generating a combined probability map based on the first and second probability maps;
means for generating augmented reality (AR) information associated with one or more objects in the first image based at least in part on the combined probability map; and
means for displaying the AR information with the first image.

31. The device of claim 30, wherein the means for generating the AR information based on the combined probability map includes means for prioritizing different objects in the first image based on the combined priority map and means for performing object identification of the different objects based on a prioritization of the different objects.

32. The device of claim 30,
wherein the first probability map defines one or more areas in the first image that have a higher probability of including an object of interest than other areas in the first image; and wherein the second probability map defines one or more areas that, based on the users eyes, have a higher probability of user interest relative to other areas in the first image.

33. The device of claim 32, further comprising means for generating a mirrored version of at least one of the first or second images so that the first and second images align from a common perspective, wherein at least one of the first and second probability maps is generated based on the mirrored version.

34. A computer-readable storage medium comprising instructions that upon execution by a processor cause the processor to:
  upon receiving a first image from a first camera of a handheld device, the first camera being pointed outward relative to a user of the handheld device, and
  upon receiving a second image using a second camera of the handheld device, wherein the second image includes eyes of the user,
  generate a probability map based on the eyes of the user in the second image, wherein the probability map includes a plurality of tiles, and one or more tiles of the probability map are given the higher priority than other tiles based at least in part on the eyes of the user in the second image;
  generate augmented reality (AR) information associated with one or more objects in the first image based at least in part on the probability map; and
  output the AR information to a display.

35. The computer-readable medium of claim 34, wherein the first and second images are time-synchronized.

36. The computer-readable medium of claim 34, wherein the instructions cause the processor to generate the AR information for every image of a first sequence of images and a second sequence of images, wherein the first sequence of images are time-synchronized with the second sequence of images.

37. The computer-readable medium of claim 34, wherein the instructions cause the processor to generate the AR information for every Nth image of a first sequence of images and every Nth image of a second sequence of images, wherein the first sequence of images are time-synchronized with the second sequence of images, and wherein N represents an integer greater than or equal to 2.

38. The computer-readable medium of claim 34, wherein the instructions cause the processor to generate the AR information in real-time.

39. The computer-readable medium of claim 34, wherein the instructions cause the processor to:
  upon receiving a first sequence of images from the first camera, and
  upon receiving a second sequence images from the second camera, wherein the second sequence of images includes the eyes of the user,
  generate a plurality of probability maps based on the eyes of the user in the second sequence of images;
  generate the AR information based at least in part on the plurality of probability maps; and
  output the AR information to the display for rendering with the first sequence of images.

40. A computer-readable storage medium comprising instructions that upon execution by a processor cause the processor to:
  upon receiving a first image from a first camera of a handheld device, the first camera being pointed outward relative to a user of the handheld device, and
  upon receiving a second image using a second camera of the handheld device, wherein the second image includes eyes of the user,
  generate a first probability map based on the one or more objects in the first image;
  generate a second probability map based on the eyes of the user in the second image;
  generate a combined probability map based on the first and second probability maps;
  generate augmented reality (AR) information associated with one or more objects in the first image based at least in part on the combined probability map; and
  output the AR information to a display.

41. The computer-readable medium of claim 40, wherein in generating the AR information based on the combined probability map, the instructions cause the processor to prioritize different objects in the first image based on the combined priority map and perform object identification of the different objects based on a prioritization of the different objects.

42. The computer-readable medium of claim 40,
  wherein the first probability map defines one or more areas in the first image that have a higher probability of including an object of interest than other areas in the first image; and
  wherein the second probability map defines one or more areas that, based on the users eyes, have a higher probability of user interest relative to other areas in the first image.

43. The computer-readable medium of claim 42, wherein the instructions cause the processor to generate a mirrored version of at least one of the first or second images so that the first and second images align from a common perspective, wherein at least one of the first and second probability maps is generated based on the mirrored version.

44. An apparatus comprising: one or more processors, the one or more processors configured to:
  upon receiving a first image from a first camera of a handheld device, the first camera being pointed outward relative to a user of the handheld device, and
  upon receiving a second image using a second camera of the handheld device, wherein the second image includes eyes of the user,
  generate a probability map based on the eyes of the user in the second image, wherein the probability map includes a plurality of tiles, and one or more tiles of the probability map are given the higher priority than other tiles based at least in part on the eyes of the user in the second image;
  generate augmented reality (AR) information associated with one or more objects in the first image based at least in part on the probability map; and
  output the AR information to a display.

45. The apparatus of claim 44, wherein the apparatus comprises a processor that is communicatively coupled to the first camera, the second camera and the display.

46. The apparatus of claim 44, wherein the apparatus comprises an AR unit of a handheld device.

47. An apparatus comprising: one or more processors, the one or more processors configured to:
  upon receiving a first image from a first camera of a handheld device, the first camera being pointed outward relative to a user of the handheld device, and
  upon receiving a second image using a second camera of the handheld device, wherein the second image includes eyes of the user, generate a first probability map based on the one or more objects in the first image;
generate a second probability map based on the eyes of the user in the second image;
generate a combined probability map based on the first and second probability maps;
generate augmented reality (AR) information associated with one or more objects in the first image based at least in part on the combined probability map; and
output the AR information to a display.

* * * * *